US009954926B2

(12) United States Patent
Yoon

(10) Patent No.: US 9,954,926 B2
(45) Date of Patent: Apr. 24, 2018

(54) QOS-GUARANTEED VIDEO STREAM METHOD AND SYSTEM, AND TRANSMITTING SERVER

(71) Applicant: SAMSUNG SDS CO., LTD., Seoul (KR)

(72) Inventor: Hee Tae Yoon, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 207 days.

(21) Appl. No.: 14/588,129

(22) Filed: Dec. 31, 2014

(65) Prior Publication Data

US 2016/0044082 A1    Feb. 11, 2016

(30) Foreign Application Priority Data

Aug. 5, 2014  (KR) .................. 10-2014-0100546

(51) Int. Cl.
*H04N 21/24*    (2011.01)
*H04N 21/647*   (2011.01)
(Continued)

(52) U.S. Cl.
CPC .......... *H04L 65/80* (2013.01); *H04L 65/4076* (2013.01); *H04L 65/602* (2013.01);
(Continued)

(58) Field of Classification Search
CPC ....... H04N 21/234327; H04N 21/2389; H04N 21/2381; H04L 65/60; H04L 67/2828
(Continued)

(56) References Cited

U.S. PATENT DOCUMENTS 8,566,393 B2 * 10/2013 Myers ............ H04N 21/234327
                                                 709/203
9,197,677 B2 * 11/2015 Myers ................. H04L 65/1069
(Continued)

FOREIGN PATENT DOCUMENTS

CN       1764184 A    4/2006
CN    101198035 A    6/2008
(Continued)

OTHER PUBLICATIONS

Communication dated Apr. 28, 2015 by the Korean Intellectual Patent Office in related Application No. PCT/KR2014/010776.

*Primary Examiner* — Edward Kim
(74) *Attorney, Agent, or Firm* — Sughrue Mion, PLLC

(57) ABSTRACT

Provided is a quality-of-service (QoS)-guaranteed video stream method. The QoS-guaranteed video stream method includes transmitting, by a transmitting server, a video stream including different video stream data for a plurality of respective layers, to a relay server, receiving, by the transmitting server, first section network state information which is information about a network state between the relay server and the transmitting server, from the relay server, receiving, by the transmitting server, second section network state information which is information about a network state between the plurality of respective user terminals and the transmitting server, and adjusting, by the transmitting server, qualities of video streams which are transmitted to the plurality of respective user terminals through the relay server by using network state information of the first section and network state information of the second section.

17 Claims, 9 Drawing Sheets

(51) Int. Cl.
    *H04L 29/06*     (2006.01)
    *H04N 19/187*     (2014.01)
    *H04N 21/00*     (2011.01)
    *H04N 21/2343*     (2011.01)
    *H04N 21/238*     (2011.01)

(52) U.S. Cl.
    CPC ......... *H04L 65/607* (2013.01); *H04N 19/187* (2014.11); *H04N 21/00* (2013.01); *H04N 21/23805* (2013.01); *H04N 21/234327* (2013.01); *H04N 21/2402* (2013.01); *H04N 21/64738* (2013.01); *H04N 21/64769* (2013.01)

(58) Field of Classification Search
    USPC ....... 709/219, 220, 221, 223, 224, 230, 231, 709/232, 233, 234
    See application file for complete search history.

(56) References Cited

U.S. PATENT DOCUMENTS

| | | | |
|---|---|---|---|
| 2002/0019984 A1* | 2/2002 | Rakib | G08B 13/19656 725/111 |
| 2003/0135863 A1* | 7/2003 | Van Der Schaar | H04L 29/06027 725/95 |
| 2007/0025369 A1* | 2/2007 | Hutter | H04N 21/2381 370/401 |
| 2010/0161823 A1* | 6/2010 | Jung | H04N 21/234327 709/231 |
| 2010/0228875 A1* | 9/2010 | Myers | H04L 65/608 709/231 |
| 2011/0188439 A1* | 8/2011 | Mao | H04N 7/17318 370/312 |
| 2012/0173748 A1* | 7/2012 | Bouazizi | H04L 65/4084 709/231 |
| 2012/0230438 A1* | 9/2012 | Shrum, Jr. | H04N 19/30 375/240.26 |
| 2013/0091528 A1 | 4/2013 | Honda | |
| 2013/0238767 A1* | 9/2013 | Gu | H04L 65/4084 709/219 |

FOREIGN PATENT DOCUMENTS

| | | |
|---|---|---|
| CN | 101232462 A | 7/2008 |
| JP | 4994283 B2 | 8/2012 |
| JP | 5029125 B2 | 9/2012 |
| JP | 2014022781 A | 2/2014 |
| KR | 10-2005-0093438 A | 9/2005 |
| KR | 101387166 B1 | 4/2014 |

\* cited by examiner

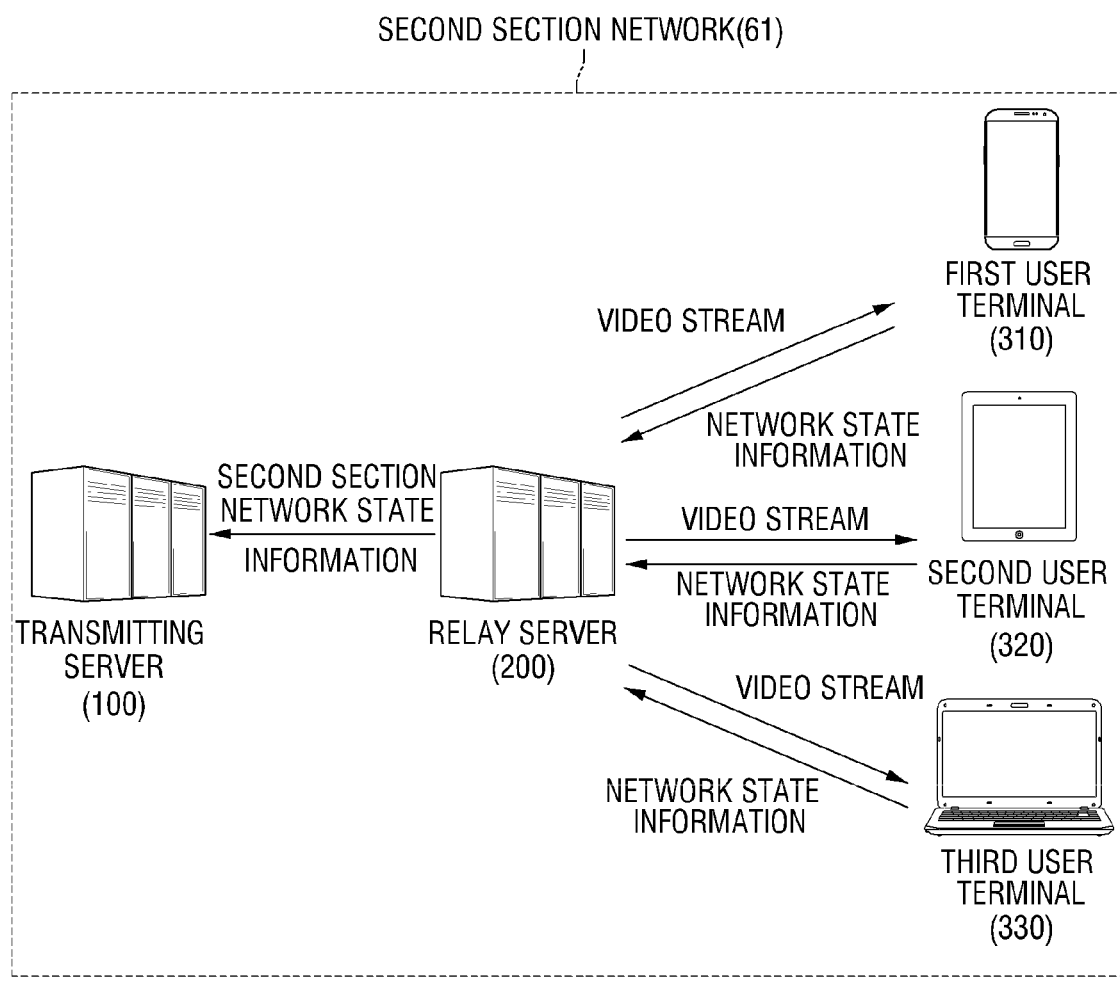

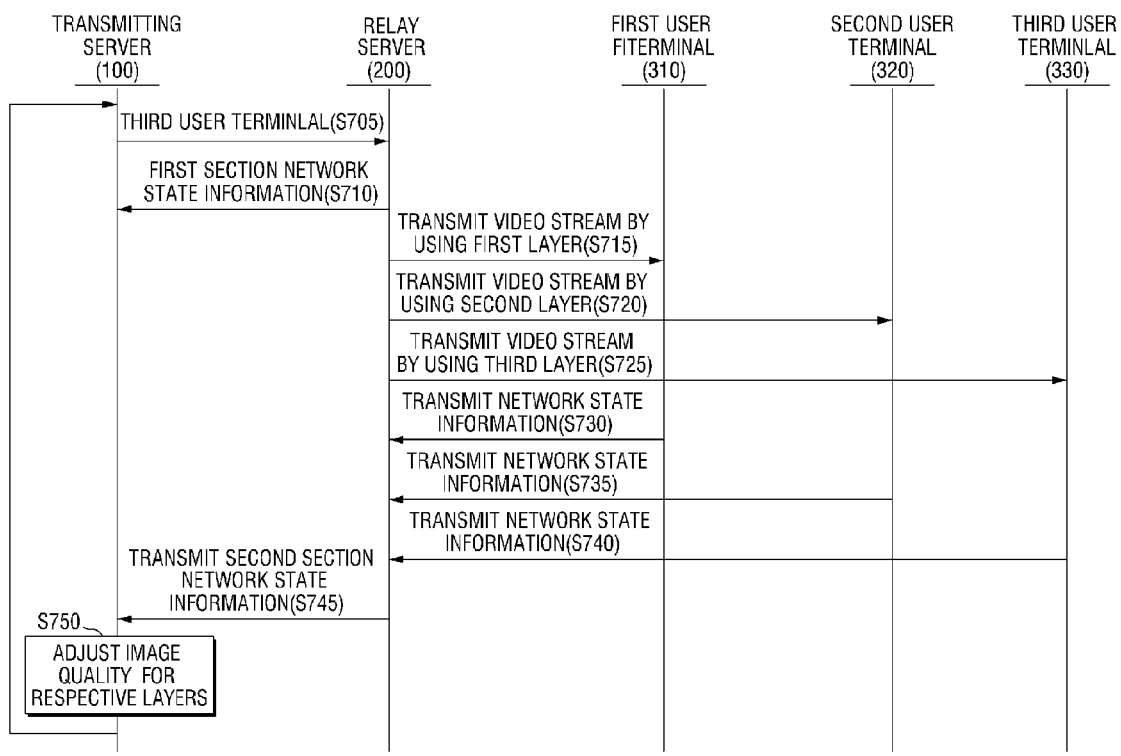

QOS-GUARANTEED VIDEO STREAM METHOD AND SYSTEM, AND TRANSMITTING SERVER

CROSS-REFERENCE TO RELATED APPLICATION

This application claims priority from Korean Patent Application No. 10-2014-0100546 filed on Aug. 5, 2014 in the Korean Intellectual Property Office, and all the benefits accruing therefrom under 35 U.S.C. 119, the contents of which in its entirety are herein incorporated by reference.

BACKGROUND

1. Field of the Invention

The present invention relates to a QoS-guaranteed video stream method and system, and a transmitting server, and more particularly, to a QoS-guaranteed video stream method and system, and a transmitting server capable of guaranteeing QoS in a scheme of providing a video stream by using a plurality of layers.

2. Description of the Related Art

Along with development of a mobile device and a mobile network, a mobile voice over internet protocol (VoIP) service, through which images are exchanged between a plurality of users in real time by using a mobile device, is getting popular. Further, a real time streaming service such as a professional baseball game live broadcast in a mobile device is also getting popular.

A scalable video codec (SVC) may be user to transmit a video stream to a plurality of users. A scalable video codec such as H.264 SVC may form one video stream with a plurality of layers so as to be transmitted.

According to the technology of providing a video stream by using a SVC, a transmitting server transmits one video stream to a relay server, and a plurality of user terminals connect to the relay server and receive the video stream.

The technology of providing a video stream by using a SVC according to a conventional art transmits a video stream which is optimized in a network situation between a transmitting server and a relay server. Hence, the image quality of the layer received by the user terminal may provide only a scheme of selecting one layer from among video streams having the image quality for each defined layer based on the network situation between the transmitting server and the relay server. That is, there is a limit that the network state between the user terminal and the relay server does not affect the quality of the video stream which is transmitted by the transmitting server.

SUMMARY

The present invention provides a QoS-guaranteed video stream method and system, and a transmitting server capable of adjusting the quality of the video which is provided to each user terminal for each layer in consideration of both the network state between the transmitting server and the relay server and the network state between respective user terminals.

The present invention further provides a QoS-guaranteed video stream method and system, and a transmitting server capable of providing a video stream while guaranteeing the QoS when providing a video stream by using a plurality of layers such as a scalable video codec (SVC).

According to an aspect of the present invention, there is provided a quality-of-service (QoS)-guaranteed video stream method comprising: transmitting, by a transmitting server, a video stream including different video stream data for a plurality of respective layers, to a relay server; receiving, by the transmitting server, first section network state information which is information about a network state between the relay server and the transmitting server, from the relay server; receiving, by the transmitting server, second section network state information which is information about a network state between the plurality of respective user terminals and the transmitting server; and adjusting, by the transmitting server, qualities of video streams which are transmitted to the plurality of respective user terminals through the relay server by using network state information of the first section and network state information of the second section.

According to another aspect of the present invention, there is provided a transmitting server comprising: a transmitting unit which transmits a video stream including different video stream data to a relay server for a plurality of respective layers; a first receiving unit which receives first section network state information, which is information about the network state between the relay server and the transmitting server, from the relay server; a second receiving unit which receives second section network state information, which is information about the network state between the plurality of respective user terminals and the transmitting server; and an adjustment unit which adjusts qualities of video streams, which are transmitted to the plurality of respective user terminals through the relay server by using the first section network state information and the second section network state information, for the respective layers.

According to another aspect of the present invention, there is provided a quality-of-server (QoS)-guaranteed video stream system comprising: a transmitting server which transmits video streams including different video stream data to a relay server for a plurality of respective layers; a relay server which transmits first section network state information, which is information on the network state with the transmitting server, to the transmitting server; and a plurality of user terminals which transmits second section network state information, which is information on the network state with the transmitting server, to the transmitting server through the relay server, wherein the transmitting server adjusts qualities of video streams which are transmitted to the plurality of respective user terminals through the relay server by using the first section network state information and the second section network state information.

According to another aspect of the present invention, there is provided a quality-of-service (QoS)-guaranteed video stream method comprising: transmitting, by a transmitting server, a video stream including different video stream data for a plurality of respective layers, to a relay server; receiving, by the transmitting server, first section network state information which is information about a network state between the relay server and the transmitting server, from the relay server; receiving, by the transmitting server, second section network state information which is information about a network state between the plurality of respective user terminals and the transmitting server; and adjusting, by the transmitting server, qualities of video streams which are transmitted to the plurality of respective user terminals through the relay server by using network state information of the first section and network state information of the second section.

According to another aspect of the present invention, there is provided a quality-of-service (QoS)-guaranteed video stream method comprising: transmitting, by a transmitting terminal, a video stream including different video stream data for a plurality of respective layers, to a relay server; receiving, by the transmitting terminal, first section network state information which is information about a network state between the relay server and the transmitting server, from the relay server; receiving, by the transmitting terminal, second section network state information which is information about a network state between the plurality of respective user terminals and the transmitting server; and adjusting, by the transmitting terminal, qualities of video streams which are transmitted to the plurality of respective user terminals through the relay server by using network state information of the first section and network state information of the second section.

BRIEF DESCRIPTION OF THE DRAWINGS

The above and other features and advantages of the present invention will become more apparent by describing in detail preferred embodiments thereof with reference to the attached drawings in which:

FIGS. 6A and 6B illustrate network state information of a second section;

FIG. 7 is a signal flowchart indicating a QoS-guaranteed video stream method according to another embodiment of the present invention;

DETAILED DESCRIPTION OF THE EMBODIMENTS

Figure 1:
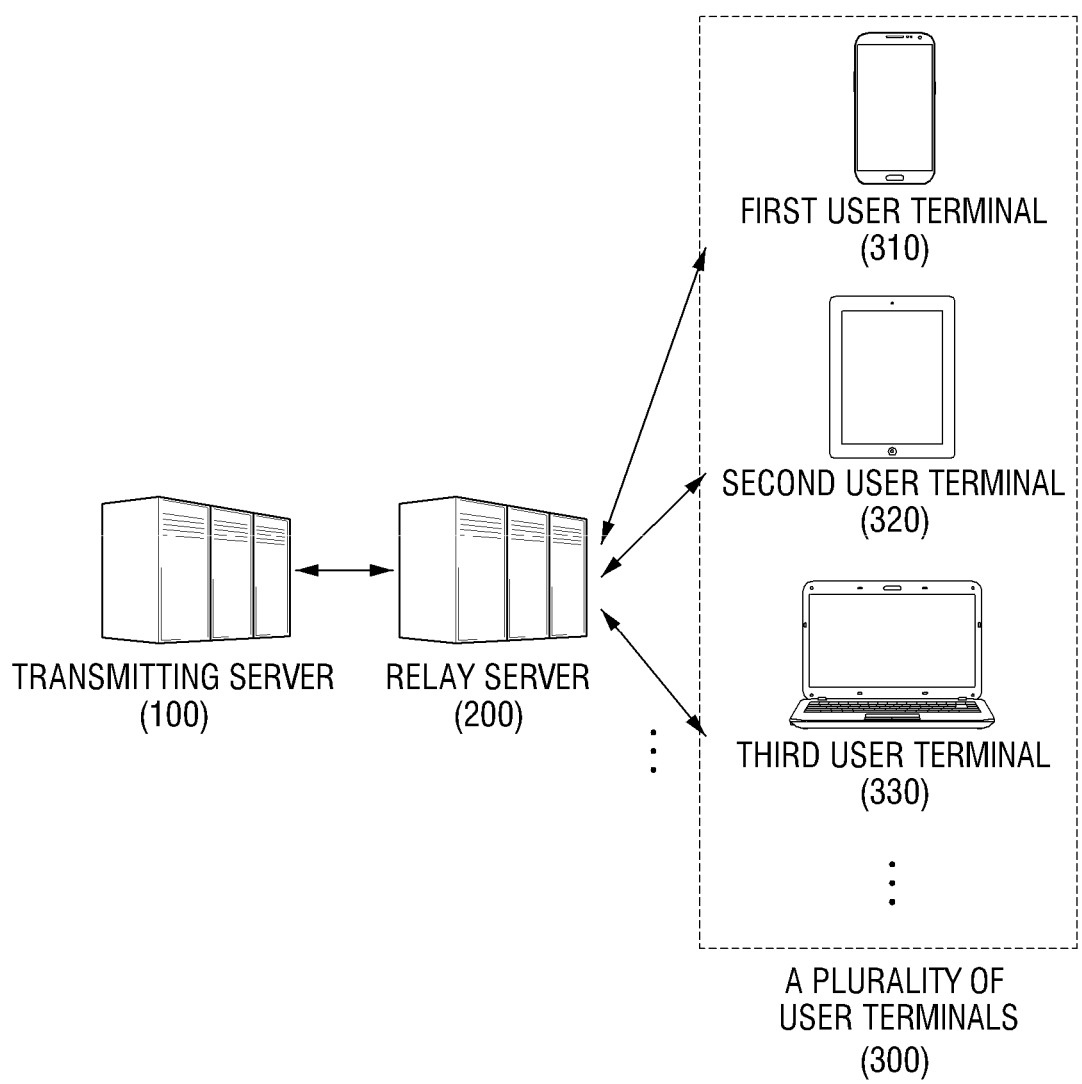
FIG. 1 is a block diagram about a QoS-guaranteed video stream system according to an embodiment of the present invention.

Hereinafter, exemplary embodiments of the present invention will be described with reference to the attached drawings. The advantages and features of the present invention and methods for achieving them will become clear by referring to the attached drawings and the embodiments which are described later in detail. However, the present invention is not limited to the embodiments which are disclosed below, but the present invention may be implemented in various other forms. The embodiments are provided to complete the disclosure of the present invention and to let one of ordinary skill in the art clearly understand the scope of the invention, and the present invention is defined by the scope of claims. The same reference numerals refer to the same components throughout the specification.

Unless defined otherwise, all the terms used in the present specification (including technical and scientific terms) may be used as meanings which may be commonly understood to one of ordinary skill in the art. Further, the terms which are defined in a generally used dictionary are not ideally or excessively understood unless specially defined.

In the present specification, a singular form also includes a plural form unless specially mentioned.

The terms "comprise" and/or "comprising" used in the specification do not exclude the existence or addition of one or more components, steps, operations, and/or devices other than the mentioned components, steps, operations, and/or devices.

FIG. 1 is a block diagram about a QoS-guaranteed video stream system according to an embodiment of the present invention.

Referring to FIG. 1, a QoS-guaranteed video stream system according to an embodiment of the present invention may include a transmitting server 100, a relay server 200, and a plurality of user terminals 300.

The transmitting server 100 transmits a video stream to the relay server 200.

The transmitting server 200 transmits a video stream, which is transmitted from the transmitting server 100, to the plurality of user terminals 300.

The QoS-guaranteed video stream system according to an embodiment of the present invention may be used in a service which provides a video stream to a user terminal by using a wired or wireless network.

The QoS-guaranteed video stream system according to an embodiment of the present invention may be applied even when there is one user terminal and may also be effectively applied when there are a plurality of user terminals.

In particular, the QoS-guaranteed video stream system according to an embodiment of the present invention may be effectively used in the service which provides a video stream by using a plurality of layers 10 such as a scalable video codec (SVC).

Figure 2:
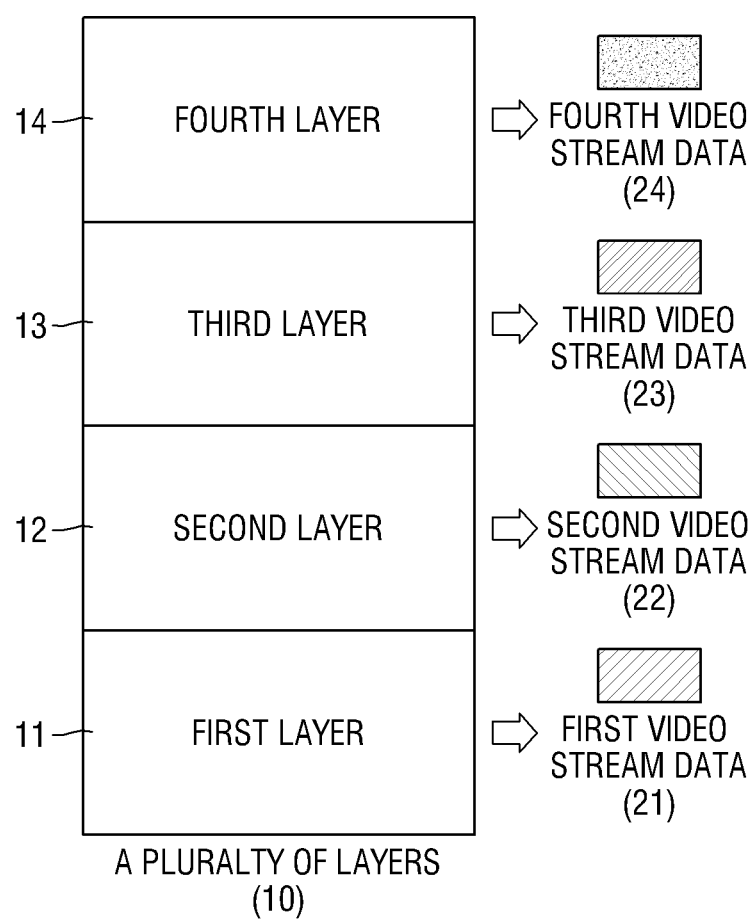
FIGS. 2 and 3 illustrate a method of providing a video stream of different qualities for respective user terminals by using a plurality of layers by a scalable video codec technology.
Figure 3:
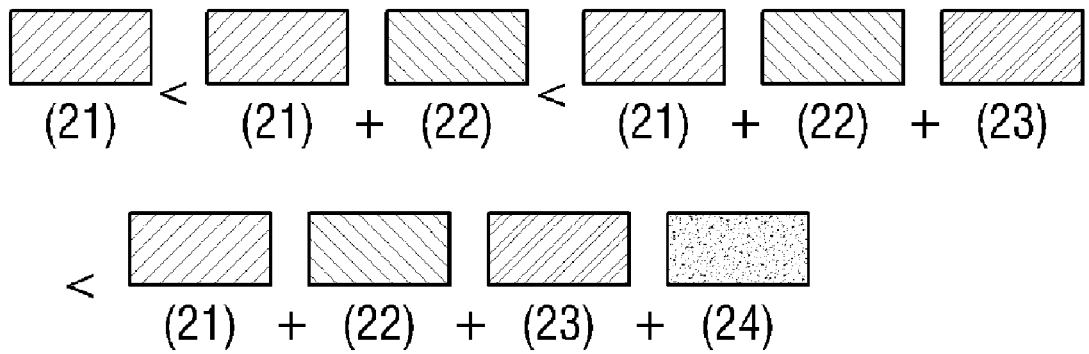

FIGS. 2 and 3 illustrate a method of providing video streams of different qualities for respective user terminals by using a plurality of layers 10 by using a SVC technology.

The plurality of layers may be 2 to 8 or more layers, but FIGS. 2 and 3 illustrate a case where there are a first layer 11, a second layer 12, a third layer 13, and a fourth layer 14.

The transmitting server 100 transmits a video stream to the user terminal via the relay server 200 by using the first layer 11 to the fourth layer 14.

The user terminal may receive first video stream data 21 by using the first layer 11. Further, the user terminal may receive first image stream data 21 and second video stream data 22 by using the first layer 11 and the second layer 12.

Further, the user terminal may receive first video stream data 21, second video stream data 22, and third video stream data 23. Further, the user terminal may receive first video stream data 21, second video stream data 22, third video stream data 23, and fourth video stream data 24 by using the first layer 11, the second layer 12, the third layer 13, and the fourth layer 14.

Referring to FIG. 3, the quality of the video received when the user terminal receives only the first video stream data 21 by using the first layer 11 may be less than the quality of the video which is provided when the user terminal receives the first video stream data 21 and the second video stream data 22 by using the first layer 11 and the second layer 22.

Further, the quality of the video received when the first video stream data 21 and the second video stream data 22 are received by using the first layer 11 and the second layer 12 may be less than the quality of the video received when the first video stream data 21, the second video stream data 22, and the third video stream data 23 are received by using the first layer 11, the second layer 12, and the third layer 13.

Further, the quality of the video received when the first stream data 21, the second video stream data 22, and the third video stream data 23 are received by using the first layer 11, the second layer 12, and the third layer 13 may be less than the quality of the video received when the first image stream data 21, the second video stream data 22, the third video stream data 23, and the fourth video stream data 24 are received by using the first layer 11, the second layer 12, the third layer 13, and the fourth layer 14.

That is, the user terminal may be provided the video of a higher quality when more video stream data is receive by using up to the upper layers than when receiving only the first stream data 21 by using the first layer 11.

Specifically, the first video stream data 21, the second video stream data 22, the third video stream data 23, and the fourth video stream data 24 are generated and encoded by using SVC technology. That is, the sum of the first video stream data 21, the second video stream data 22, the third video stream data 23, and the fourth video stream data 24 may be the same as the data which is generated by encoding the video with the best resolution by using the SVC technology. The first video stream data 21 may replayed only with the first video stream data 21, but the image quality such as the resolution is low, and as the video stream data, which is received by using the upper layers, is added, the image quality gets closer to the best resolution.

When it is stated in the present specification that a video stream is transmitted or received by using an upper layer, it also includes transmitting or receiving the video stream by using the lower layers of the upper layer.

That is, when it is stated in the present specification that the transmitting server transmits a video stream to the first user terminal 310 via the relay server 200 using the third layer 13, it means that the first video stream data 21 which is transmitted by using the first layer 11, the second video stream data 22 which is transmitted by using the second layer 12, and the third video stream data 23 which is transmitted by using the third layer 13 are also included when transmitted.

As another example, if it is stated in the specification that the transmitting server 100 transmits a video stream to the first user terminal 310 through the relay server 200 by using the fourth layer 14, it means that the first video stream data 21 which is transmitted by using the first layer 11, the second video stream data 22 which is transmitted by using the second layer 12, the third video stream data 23 which is transmitted by using the third layer 13, and the fourth video stream data 14 which is transmitted by using the fourth layer 14 are also included when transmitted.

The QoS-guaranteed stream system according to an embodiment of the present invention may be more effectively applied to the video stream providing system by using the above-described scalable video codec than the video stream service which is provided the video stream by selecting one of a low image quality, an intermediate image quality, and a high image quality.

In the video streaming service in which the video stream is provided by selecting one of a low image quality, an intermediate image quality, and a high image quality, if the user selects the high image quality, the video stream data of a high image quality are provided, but when the network environment is poor, the video may frequently stop.

However, in the QoS-guaranteed stream system according to an embodiment of the present invention, the user does not select the image quality, and the video streaming is provided by adjusting the image quality in real time or periodically in consideration of the network environment, and thus even if the image quality is lowered, the video rarely stops.

To this end, the QoS-guaranteed video stream system according to an embodiment of the present invention adjusts the image quality which is provided for respective user terminal in overall consideration of the information on the network state between the transmitting server 100 and the relay server 200 and the information on the network state between the relay server 200 and respective user terminals.

Hereinafter, a method of providing a QoS-guaranteed video stream by adjusting the quality of the video which the QoS-guaranteed video stream system provides to respective user terminals will be described with reference to FIGS. 1 and 4 to 6.

Figure 4:
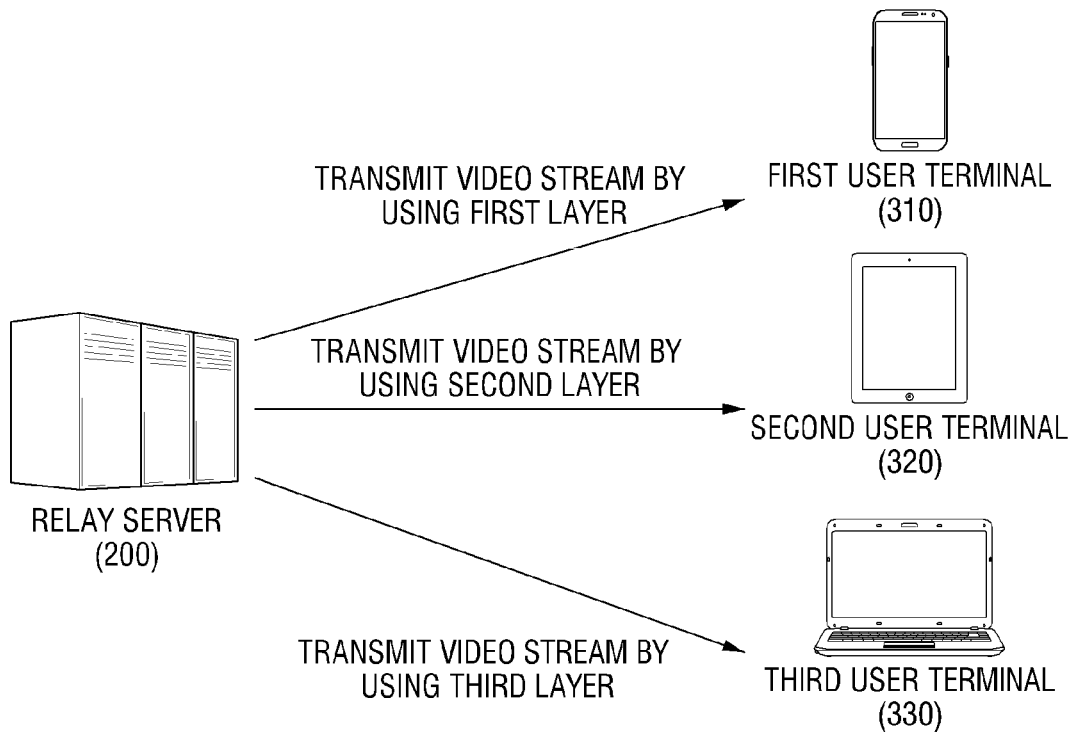
FIG. 4 illustrates an example about a video stream which is received by each user terminal.

FIG. 4 illustrates an example about a video stream which is received by each user terminal.

Referring to FIGS. 1 and 4, the relay server 200 receives a video stream from the transmitting server 100. The relay server 200 transmits a video stream to each user terminal by using a specific layer according to the setting in the transmitting server 100.

A specific method of transmitting a video stream by using a specific layer to each user terminal according to the setting in the transmitting server 100 will be described later.

Continually referring to FIG. 4, the first user terminal 310 receives a video stream by using the first layer 11. The second user terminal 320 receives a video stream by using the second layer 12. The third user terminal 330 receives a video stream by using the third layer 13.

As described above, the second user terminal 320 receives first video stream data 21 and second video stream data 22 by using the second layer 12 and replays the video by using the first video stream data 21 and the second video stream data 22, and thus the image quality may be better than when receiving the video stream by using the first layer 11.

Likewise, the third user terminal 330 receives the first video stream data 21 to the third video stream data 23 by using the third layer 13 in order to replay a video, and thus the image quality may better than the image quality of the video which is replayed in the first user terminal 310 and the second user terminal 320.

Figure 5:
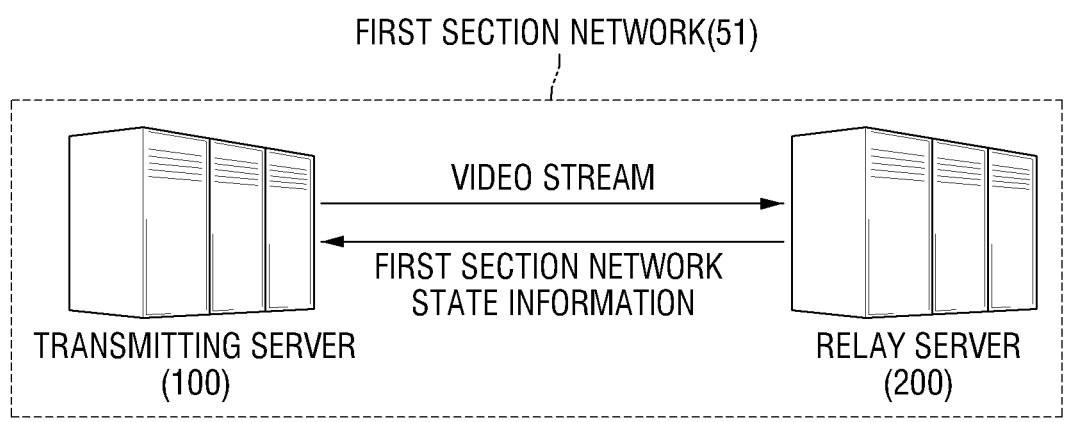
FIG. 5 illustrates network state information of a first section.

FIG. 5 illustrates the state information of a first section network 51.

The transmitting server 100 adjusts the image quality of the video which is provided for respective user terminals 310, 320, and 330 in overall consideration of the network state information between the transmitting server 100 and the relay server 200 and the network state information between the relay server 200 and respective user terminals 310, 320, and 330.

Referring to FIG. 5, the network between the transmitting server 100 and the relay server 200 is called a first section network 51. The transmitting server 100 transmits a video stream to the relay server 200. The relay server 200 transmits the state information on the first section network 51 to the transmitting server 100.

That is, the transmitting server 100 receives the state information on the first section network 51 from the relay server 200.

Specifically, the transmitting server 100 may receive state information of the first section network 51 from the relay server 200 by using the real time transport protocol (RTCP).

The state information of the first section network 51 may include at least one of a packet loss, a jitter, and a delay in the first section network.

Further, state information on the first section network 51 may include information which is needed to calculate the available bandwidth for respective user terminals 310, 320, and 330.

The available bandwidth may be calculated by various methods, and respective methods have their own advantages and disadvantages. A specific method for calculating the available bandwidth may include an already known method and may be set in consideration of the network environment to which the present invention is applied. For example, the available bandwidth may be calculated by using at least one of the packet loss, the jitter, and the delay information.

The relay server 200 may transmit the state information of the first section network 51 to the transmitting server 100 in real time, periodically, or aperiodically. The relay server 200 may use transmitting state information of the first section network 51 to the transmitting server 100 periodically in consideration of the network changeability and the load of the data transmission and reception and data process, etc. as the basic setting.

Figure 6A:
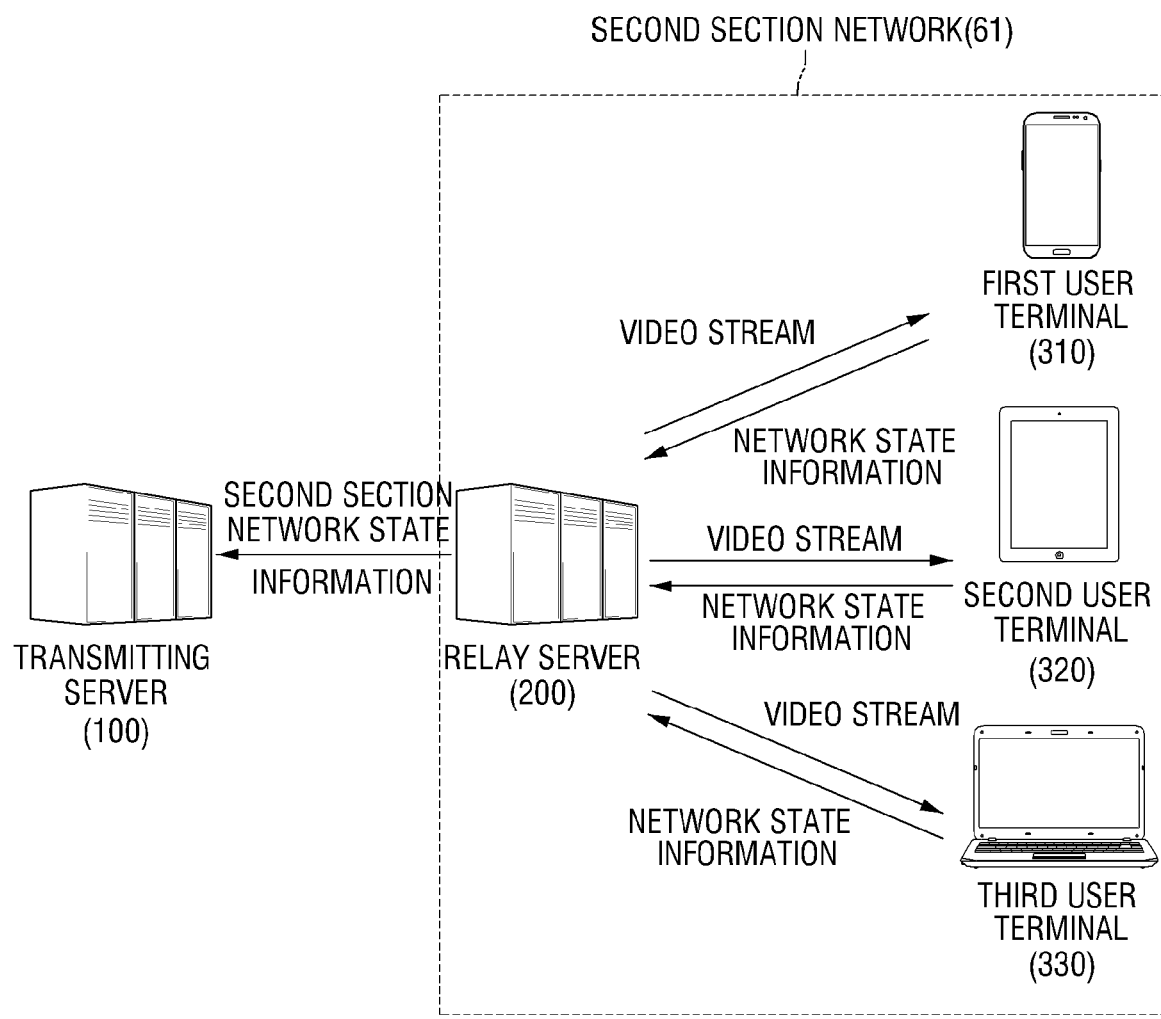

FIGS. 6A and 6B illustrate state information of the second section network.

Referring to FIG. 6A, the second section network 61 refers to a network between the relay server 200 and the user terminal.

The relay server 200 transmits a video stream received from the transmitting server 100 to respective user terminals 310, 320, and 330, and receives state information of the second section network 61 from respective user terminals.

For example, the relay server 200 receives network state information between the relay server 200 and the first user terminal 310 from the first user terminal 310.

The relay server 200 receives the network state information between the relay server 200 and the second user terminal 320 from the second user terminal 320.

The relay server 200 receives network state information between the relay server 200 and the third user terminal 330 from the third user terminal 330.

The network state information sets, which are received from the first user terminal 310, the second user terminal 320, and the third user terminal 330, which are respective user terminals, by the relay server 200, become the state information of the second section network 61.

The relay server 200 transmits the state information of the second section network 61 including the network state information, which is received from respective user terminals, to the transmitting server 100.

The relay serve 200 may receive network state information in real time, periodically, or aperiodically from respective user terminals 310, 320, and 330. However, when the relay server 200 collects the network state information received from respective user terminals 310, 320, and 330, and transmits the collected network state information to the transmitting server 100, the relay server 200 needs to perform a procedure for collecting the state of the second section network 61.

Hence, the case where the relay server bypasses the state information of the second section to the transmitting server 100 may be more easily implemented.

The relay server 200 may transmit state information on the second section network 61, which is received from respective user terminals 310, 320, and 330, to the transmitting server 100 in real time, periodically, or aperiodically.

Respective user terminals 310, 320, and 330 may transmit network state information between the relay server 200 and respective user terminals 310, 320, and 330 to the relay server 200 by using a real time transport protocol (RTCP).

The relay server 200 may also transmit the state information on the second section network 61 to the transmitting server 100 by using RTCP.

However, the relay server 200 may transmit the data, which is transmitted by the transmitting server 100, in a bypassing form without a particular process. Hence, the network state information, which may be measured in respective user terminals 310, 320, and 330, may substantially become the network state information between the transmitting server 100 and the user terminal itself which measures the network state information.

Referring to FIG. 6B, the second section network 61 may substantially become a network between the transmitting server 100 and respective user terminals. However, when the relay server processes the data, which is transmitted from the transmitting server 100, without transmitting the data in a bypassing form, the second section network 61 may be like as shown in FIG. 6A.

In FIGS. 6A and 6B, the state information of the second section network 61 includes network state information which each user terminal transmits to the transmitting server through the relay server. That is, in FIG. 6B, the relay server 200 transmits the network state information between the first user terminal 310 and the transmitting server 100 which is received from the first user terminal, from among the state information on the second section network 61, to the transmitting server 100 through a bypass. Further, the relay server 200 transmits the network state information between the second user terminal 320 and the transmitting server 100, which is received from the second user terminal 320, from among the state information on the second section network 61, to the transmitting server 100 through a bypass. Further, the relay server 200 transmits the network state information between the third user terminal 330 and the transmitting server 100, which is received from the third user terminal 330, from among the second section network 61, to the transmitting server 100 through a bypass.

The state information on the second section network 61 may contain at least one of the packet loss, the jitter, and the delay in the second section network 61. That is, in FIG. 6, the state information on the second section network 61 includes information on at least one of the packet loss, the jitter, and the delay in the network between the relay server 200 and the first user terminal 310. Further, the state information on the second section network 61 includes information on at least one of the packet loss, the jitter, and the delay in the network between the relay server 200 and the second user terminal 320. Further, the state information on the second section network 61 includes information on at least one of the packet loss, the jitter, and the delay in the network between the relay server 200 and the third user terminal 330.

The state information on the second section network 61 may contain information which is needed to calculate the available bandwidth for respective user terminals 310, 320, and 330.

As described above, there may be various methods of calculating the available bandwidth and an already known method may also be used. Further, the method may also be set in consideration of the network environment to which the present invention is applied. For example, the available bandwidth may be calculated the jitter information in the first section network 51 and the jitter information in the second section network 61.

The state information of the second section network 61 may include the identification information of the user terminal which has transmitted the network state information to the relay server 200. The transmitting server 100 may identify the user terminal which has transmitted specific network state information by using identification information.

Identification information may be, for example, information which has used a unique key. As another example, the identification information may be information which uses the network address such as an IP address or port at which a video stream is received.

The transmitting server 100 adjusts the quality of the image which is received by respective user terminals by using the state information on the first section network 51 and the state information on the second section network 61.

The transmitting server 100 may adjust the quality of the video streams which are transmitted for respective layers in order to adjust the qualities of the videos which are received by respective user terminals.

The QoS-guaranteed video stream system and the transmitting server 100 according to an embodiment of the present invention will be described in more detail with reference to the QoS-guaranteed video stream system according to another embodiment of the present invention.

Hereinafter, a QoS-guaranteed video stream method according to another embodiment of the present invention will be described with reference to FIGS. 7 to 10.

The points explained in the QoS-guaranteed video stream method and the transmitting server 100 according to another embodiment of the present invention may be applied to the QoS-guaranteed video stream method and the transmitting server 100 according to the first embodiment of the present invention. Further, the points explained in the QoS-guaranteed video stream method and the transmitting server 100 according to the first embodiment of the present invention may also be applied to the QoS-guaranteed video stream method and the transmitting server 100 according to other embodiments of the present invention.

FIG. 7 is a signal flowchart indicating a QoS-guaranteed video stream method according to another embodiment of the present invention.

Referring to FIG. 7, the transmitting server 100 transmits a video stream to the relay server 200 (S705).

The transmitting server 100 receives the state information on the first section network 51, which is the network state information between the relay server 200 and the transmitting server 100, from the relay server 200 (S710).

There may be a plurality of user terminals. FIG. 7 illustrates a case where there are three user terminals.

The user terminal may receive a video stream, which is transmitted by the transmitting server 100, through the relay server 200.

The first user terminal 310 may receive a video stream by using the first layer 11 (S715). That is, the first user terminal 310 may receive a first video stream by using the first layer 11.

The second user terminal 320 may receive a video stream by using the second layer 12 (S720). That is, the second user terminal 320 may receive first video stream by using the first layer 11 and may receive second video stream data 22 by using the second layer 12.

The user terminal 330 may receive a video stream by using the third layer 13 (S720). That is, the third user terminal 330 may receive the first video stream data 21 by using the first layer 11, may receive second video stream data 22 by using the second layer 12, and may receive third video stream data 23 by using the third layer 13.

The quality of the video, which is replayed by the second user terminal 320 and the third user terminal 330, is higher than the quality of the video which is replayed by the first user terminal 310. The quality of the video, which is replayed by the third user terminal 330, is higher than the quality of the video which is replayed by the second user terminal 320.

The first user terminal 310 transmits network state information between the first user terminal 310 and the relay server 200 to the relay server 200 (S730).

The second user terminal 320 transmits the network state information between the second user terminal 320 and the relay server 200 to the relay server 200 (S735).

The third user terminal 330 transmits the network state information between the third user terminal 300 and the relay server 200 to the relay server 200 (S740).

The relay server 200 transmits state information on the second section network 61, which is received from respective user terminals 310, 320, and 330 in operations S730, S735, and S740, to the transmitting server 100 (S745).

Specifically, the relay server 200 may collect the state information on the second section network 61 which is received from respective user terminals 310, 320, and 330 and periodically transmit the collected state information to the transmitting server 100.

Preferably, if the relay server 200 receives the state information on the second section network 61 from respective user terminals 310, 320, and 330, the relay server 200 may promptly transmit the received state information to the transmitting server 100 through a bypass without performing a process such as the collection.

The transmitting server 100 may adjust the quality of the video stream for respective layers by using the state information of the first section network 51 and the state information of the second section network 61 so that respective user terminals 310, 320, and 330 may be provided a video stream of a quality which is optimized in the network situation while guaranteeing QoS (S750).

The transmitting server 100 may periodically (or aperiodically) receive the state information of the first section network 51 and the state information of the second section network 61. The transmitting server 100 may adjust the quality of a video stream for respective layers by using the state information of the first section network 51 and the state information of the second section network 61 which are periodically received so that respective user terminals 310, 320, and 330 may be provided a QoS-guaranteed video stream.

Specifically, the transmitting server 100 may calculate the available bandwidth for respective user terminals 310, 320, and 330 by using the state information of the first section network 51 and the state information of the second section network 61 and adjust the quality of the video stream for respective layers by using the calculated available bandwidth. For example, when the available bandwidth of a certain user terminal is greater than a currently used bandwidth, the user terminal may be provided a video of a higher quality, which shows that the transmitting server 100 may provide a video stream of a higher quality.

Further, the transmitting server 100 may adjust the quality of the video stream for respective layers by using the packet loss, jitter, and delay information which are included in the state information of the first section network 51 and the state information of the section network 61. For example, when the packet loss, jitter, or delay information of a certain user terminal is high, it is understood that the current network situation of the user terminal is poor, and thus the transmitting server 100 may provide video stream data of a lower quality so that the video does not stop.

Figure 8:
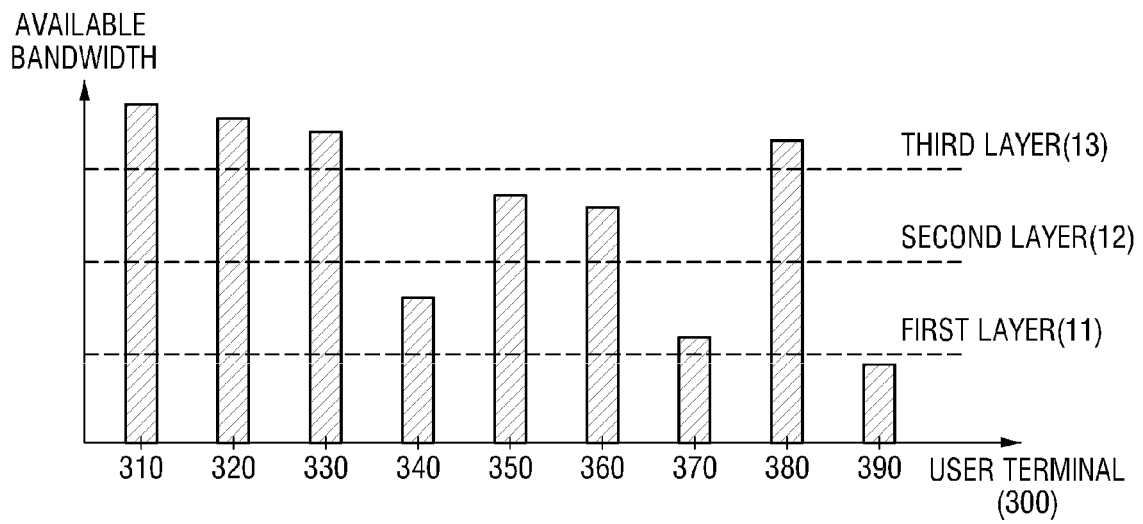
FIGS. 8 to 10 illustrate an example of adjusting the quality of the video stream for respective layers by a transmitting server.
Figure 9:
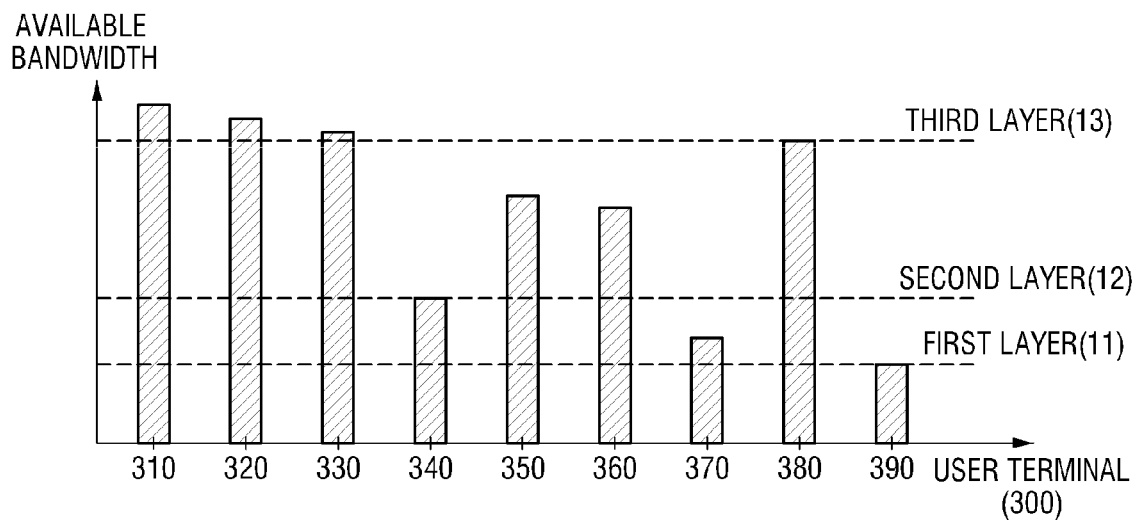
Figure 10:
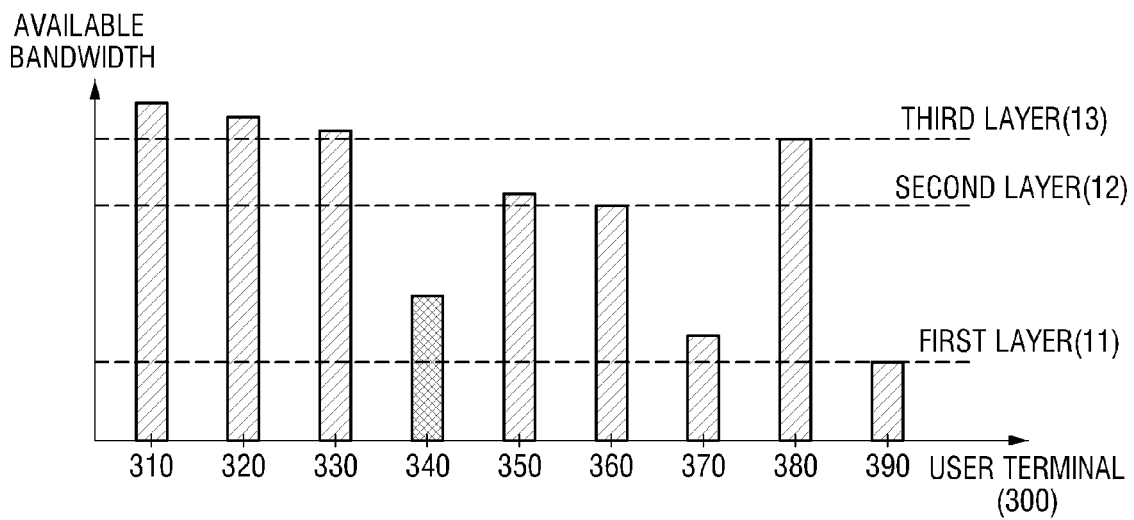

FIGS. 8 to 10 illustrate an example where the transmitting server 100 adjusts the quality of a video stream for respective layers.

Specifically, FIGS. 8 to 10 illustrate an example of adjusting the quality of a video stream for respective layers by calculating available bandwidths for respective user terminals and adjusting the quality of video streams for respective layers by using the calculated available bandwidths.

Referring to FIG. 8, a plurality of user terminals 300 include a first user terminal 410 to a ninth user terminal 390.

The transmitting server 100 may receive state information of the first network state 51 and the state information of the second section network 61 and calculate respective available bandwidths of the first user terminal 310 to the ninth user terminal 390 by using the received network state information.

The transmitting server 100 may understand the information on the currently used layers for respective user terminals and bandwidths which are used by the current layers by using the received state information of the first section network 51 and state information of the section network 61. However, the currently used layers for respective user terminals and the bandwidths used by current layers are adjusted and determined by the transmitting server 100, and thus they are not necessarily understood by using the state information of the first section network 51 and the state information of the second section network 61.

Continually referring to FIG. 8, the first user terminal, the second user terminal 320, the third user terminal 330, and the eighth user terminal 380 are provided a video stream by using the third layer 13.

The fact that the user terminal is provided a video stream by using the third layer 13 means that the first video stream data 21 and the second video stream data 22, which use the first layer 11 and the second layer 12, are also received, and thus the largest amount of bandwidths are used and the video of the highest quality may be provided.

The fourth user terminal 340, the fifth user terminal 350, and the sixth user terminal 360 are provided a video stream by using the second layer 12.

The seventh user terminal 370 and the ninth user terminal 390 are provided a video stream by using the first layer 11.

The values, which are generated as the transmitting server 100 calculates available bandwidths of from the first user terminal 310 to the ninth user terminal 390 by using the information on the first section network 51 and the information on the second section network 61.

The transmitting server 100 may adjust the image quality such as the transmission rate of the video stream which is provided by using a specific layer on the basis of the user terminal having the lowest available bandwidth from among user terminals which receive a video stream by using the specific layer.

FIG. 9 illustrates an example of adjusting a video quality for respective layers by the transmitting server 100.

That is, referring to FIG. 8, all user terminals, which receive a video stream by using the third layer 13, have sufficient available bandwidths. Further, it may be understood that the eighth user terminal 380 is the user terminal having the lowest available bandwidth from among user terminals which receive a video stream by using the third layer 13.

Hence, referring to FIG. 9, the transmitting server 100 may adjust the transmission rate of the video stream which is provided by using the third layer on the basis of the available bandwidth of the eighth user terminal 380 so that the user terminals which use the third layer 13 may receive the video of a higher quality.

Referring to FIG. 8, the available bandwidth of the fourth user terminal 340, from among the user terminals which receive a video stream by using the second layer 12, is not enough to receive a video stream by using the current second layer 12.

Hence, referring to FIG. 9, the transmitting server 100 may lower the transmission rate of the video stream which is provided by using the second layer 12 on the basis of the fourth user terminal 340 having the lowest available bandwidth from among user terminals which receive a video stream by using the second layer 12, so that all user terminals which use the second layer 12 may receive a video stream in the QoS-guaranteed environment.

Referring to FIG. 8, from among the user terminals which receive a video stream by using the first layer 11, the available bandwidth of the ninth user terminal 390 is lowest. Hence, referring to FIG. 9, the transmitting server 100 may lower the transmission rate of the video stream which is provided by using the first layer 11 on the basis of the ninth user terminal 390 so that the video stream may be received in the QoS-guaranteed environment.

FIG. 10 illustrates another example of adjusting the image quality for respective layers by the transmitting server 100.

The transmitting server 100 adjusts the image quality such as the transmission rate of the video stream which is provided by using a specific layer on the basis of a user terminal having the lowest available bandwidth from among user terminals which receive a video stream by using the specific layer. However, if the user terminal having the lowest available bandwidth is a predetermined level or less, the layer used by the user terminal having the lowest bandwidth is changed to the lower layer. Further, the transmitting server 100 may adjust the image quality such as the transmission rate of the video stream which is provided by using the specific layer on the basis of the user terminal having the second lowest available bandwidth.

When the user terminal having the second lowest available bandwidth is a predetermined level or less, the transmitting server 100 may change the layer, which is used by the user terminal having the second lowest available bandwidth, to a lower layer. Further, the transmitting server 100 may adjust the image quality such as the transmission rate of a video stream which is provided by using the specific layer on the basis of the available bandwidth of the user terminal having the lowest available bandwidth from among the remaining user terminals.

By such a scheme, the phenomenon that the overall quality is lowered on the basis of the user terminal of which network state is poor or has become poor may be prevented.

More specifically, referring to FIGS. 8 to 10, when the transmission rate of a video stream, which is provided by using the second layer 12 on the basis of the fourth user terminal 340 which uses the second layer 12, is lowered, QoS may be guaranteed, but the fifth user terminal 350 and the sixth user terminal 360 cannot sufficiently use the bandwidth and may be provided the video of a low quality. Hence, the transmitting server 100 may change the layer used by the fourth user terminal 340 to the first layer 11. Further, the transmitting server 100 may enhance the transmission rate of the video stream which is provided by using the second layer 12 on the basis of the sixth user.

Similarly to what has been described with reference to FIG. 10, when there is a user terminal of which the available bandwidth is a predetermined level or higher, the transmitting server 100 may be set to be provided the video of a high quality by changing the layer used by the user terminal to an upper layer.

The predetermined level may be set in consideration of the bandwidth which is used in the video stream for respective layers and the gap of the bandwidth which is used in the video stream for respective layers. Further, the predetermined level may be flexibly changed as the bandwidth, which is used in the video stream, is changed for respective layers.

The transmitting server 100 does not necessarily need to adjust the quality of the video stream for respective layers by calculating the available bandwidth. The transmitting server 100 may set the critical value for respective indicators which reveal the network state such as the packet loss, the jitter, and the delay information, and adjust the image quality so that the network state for the video stream may be maintained lower than the critical value.

The adjusting of the image quality includes adjusting the transmission rate.

Further, the transmitting server 100 may set a specific function by using one of indicators such as the packet loss, the jitter, and the delay, not the available bandwidth, and may adjust the image quality for respective layers by adjusting the transmission rate, etc. for respective layers in order to make the value of the predetermined specific function to be lower than a preset critical value or to be minimized. The specific function may be differently set or changed according to the network situation or type, etc.

When the transmitting server 100 set a specific function and adjusts the image quality for respective layers by using the predetermined specific function, the points of calculating the available bandwidth and adjusting the image quality for respective layers by using the calculated bandwidth which has been described with reference to FIGS. 7 to 9 may be used in the same or similar manner.

As another example of adjusting the image quality for respective layers by the transmitting server 100, in a situation as in FIG. 8, if a specific user terminal is an important terminal having a higher priority such as a terminal used for a CEO conference, the QoS may be guaranteed on the basis of the important terminal so that the highest quality video stream may be provided to the terminal and thereby the image quality may be adjusted for respective layers.

The transmitting server 100 may the information of image quality adjustment for respective layers to respective user terminals through the relay server 200.

For example, the transmitting server 100 may include receiver information of each packet in the each packet when transmitting each packet. Specifically, it is assumed that there is user terminal A which receives video stream data by using both the first layer 11 to the third layer 13, user terminal B which receives video stream data by using the first layer 11 and the second layer 12, and user terminal C which receives video stream data by using the first layer 11.

Under the above consumption, the transmitting server 100 includes user terminals A, B, and C as the receiver information in the packet header of the first video stream data 21 which uses the first layer 11 from among the video stream data of which image quality has been adjusted. Further, the transmitting server 100 includes user terminals A and B as the receiver information in the packet header of the second video stream data 22 which uses the second layer 12 from among video stream data of which the image quality has been adjusted. Further, the transmitting server 100 includes terminal A as the receiver information in the packet header of the third video stream data 23 which uses the third layer 13 from among video stream data of which the image quality has been adjusted. Likewise, after including the receiver information in the packet header, the video stream may be transmitted to the relay server 200.

As another method, the transmitting server 100 includes a value which allows judgment on the layer information of the packet in the packet header of the video stream data. Further, the transmitting server 100 may transmit a separate message to the relay server 200 in order to reveal the information that user terminal A receives video stream data by using all of the first layer 11 to the third layer 13, user terminal B receives video stream data by using the first layer 11 and the second layer 12, and user terminal C receives video stream data by using the first layer 11.

The relay server 200 may determine the layer of the packet of the received video stream data, and thus an appropriate layer may be relayed to respective user terminals according to the information included in a separate message.

Further, the transmitting server 100 may not separately include the value for determining the layer information in the packet, and the relay server 200 may determine the layer information of the packet by analyzing the video stream data.

Figure 11:
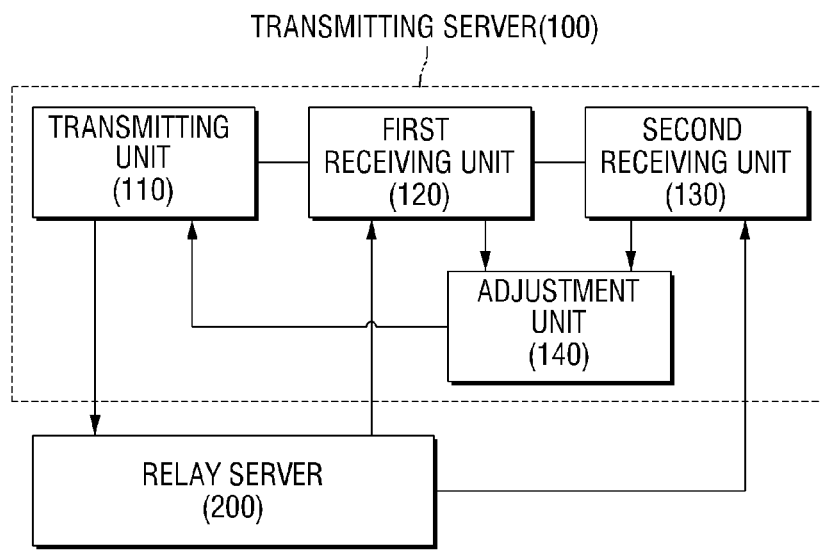
FIG. 11 is a block diagram illustrating a transmitting server according to further another embodiment of the present invention.

FIG. 11 is a block diagram illustrating a transmitting server 100 according to further another embodiment of the present invention.

Referring to FIG. 11, the transmitting server 100 may include a transmitting unit 110, a first receiving unit 120, a second receiving unit 130, and an adjustment unit 140. Each of the transmitting unit, the first receiving unit, the second receiving unit, and the adjustment unit are implemented via a CPU or hardware processor.

The transmitting unit 110 transmits a video stream to the relay server 200.

The transmitting unit 110 transmits a video stream, of which the image quality has been adjusted for respective layers in the adjustment unit, to the relay server 200.

The first receiving unit 120 may receive network information of the first section. The second receiving unit 130 may receive network information of the second section.

Both the information on the first section network 51 and the information on the second section network 61 may be received from the relay server 200, and thus the first receiving unit 120 and the second receiving unit 130 may be processed by one receiving unit.

The adjustment unit 140 may guarantee QoS by adjusting the image quality by adjusting the transmission rate for respective layers by using the information on the first section network 51 and the information on the second section network 61.

The transmitting server 100 according to an embodiment of the present invention, which has been described with reference to FIGS. 1 to 11, is not necessarily a server, but it may also be a terminal.

For example, in the peer to peer (P2P) network connection, the role of the transmitting server 100 may be performed by a specific terminal.

Respective components of FIG. 11 may be software, or hardware such as field-programmable gate array (FPGA) or application-specific integrated circuit (ASIC). However, the components are not limited to software or hardware, but the components may be configured to be in an addressable storage medium or may be configured to execute one or more processors. The function, which is provided in the components, may be implemented by more segmented components, and may be implemented as one component which performs a certain function by combining a plurality of components.

According to some embodiments of the present invention, a video stream may be provided while guaranteeing the QoS when providing a video stream by using a plurality of layers such as a scalable video codec (SVC).

According to some embodiments of the present invention, a video stream of a quality optimized in a network situation may be provided to each user terminal by adjusting the image quality in consideration of the overall network state between the transmitting server, the relay server, and respective user terminals.

The embodiments of the present invention have been described above with reference to the attached drawings, but it may be understood by one of ordinary skill in the art that the present invention may be executed in other specific forms without changing the technical idea and essential features. Hence, it should be understood that the above-described embodiments are merely examples and do not limit the scope of the present invention.

What is claimed is:

1. A quality-of-service (QoS)-facilitating video streaming method comprising:
    transmitting, by a transmitting server, to a relay server, a video stream including a plurality of video data streams, a first video data stream of the plurality of video data streams corresponding to a first layer of a plurality of respective layers of the video stream, and a second video data stream of the plurality of video data streams corresponding to a second layer of a plurality of respective layers of the video stream;
    receiving, by the transmitting server, from the relay server, first section network state information which is information about a network state between the relay server and the transmitting server;
    receiving, by the transmitting server, from the relay server, second section network state information which is information about a network state between a plurality of respective user terminals and the transmitting server; and
    adjusting, by the transmitting server, by using the first section network state information and the second section network state information, a transmission rate of the first video data stream,
    wherein every data of the first video data stream is transmitted to first corresponding user terminals of the plurality of respective user terminals through the relay server at the adjusted transmission rate, and every data of the second video data stream is transmitted to second corresponding user terminals of the plurality of user terminals at the original transmission rate of the second video data stream through the relay server.

2. The QoS-facilitating video streaming method of claim 1, wherein the first section network state information comprises information for calculating available bandwidths for the respective user terminals.

3. The QoS-facilitating video streaming method of claim 1, wherein the first section network state information comprises at least one from among a packet loss, a jitter, and a delay.

4. The QoS-facilitating video streaming method of claim 1, wherein the receiving of the second section network state information comprises receiving a plurality of pieces of second section network state information through the relay server, thereby forming the second section network state information, the plurality of pieces of second section network state information having been respectively transmitted by the plurality of respective user terminals.

5. The QoS-facilitating video streaming method of claim 1, wherein the transmitting of the video stream to the relay server comprises transmitting, by the transmitting server, an image stream which is generated to include the plurality of video data streams for the plurality of respective layers by using a scalable video codec (SVC) technology.

6. The QoS-facilitating video streaming method of claim 1, wherein the second section network state information comprises information for calculating available bandwidths for the respective user terminals, and identification information of a user terminal which has transmitted network information included in the second section network state information.

7. The QoS-facilitating video streaming method of claim 1, wherein the second section network state information comprises at least one from among a packet loss, a jitter, and a delay, and further includes identification information of a user terminal which has transmitted network information which is included in the second network state information.

8. The QoS-facilitating video streaming method of claim 1,
    wherein the plurality of respective layers comprises the first layer and a second layer,
    wherein the first layer corresponds to a first video stream of the plurality of respective video streams, and the second layer corresponds to a second video stream of the plurality of respective video streams; and
    wherein the adjusting of qualities of the plurality of respective video streams for the plurality of respective layers further comprises:
    adjusting a quality of the second video stream which is transmitted by using the second layer based on an available bandwidth of a user terminal having the lowest available bandwidth from among user terminals which receive the video stream by using the second layer.

9. The QoS-facilitating video streaming method of claim 1, wherein the adjusting of the qualities of the plurality of respective video streams comprises:
    changing a video stream, which is transmitted to a user terminal having an available bandwidth of a predetermined reference bandwidth or less from among user terminals which receive a video stream, by using a second layer corresponding to a user terminal having the lowest available bandwidth.

10. The QoS-facilitating video streaming method of claim 9, wherein the adjusting of the qualities of the plurality of respective video streams for the plurality of respective layers further comprises:
    adjusting a quality of a video stream which is transmitted by using the second layer based on an available bandwidth of a user terminal from among user terminals which receive the video stream by using the second layer, the user terminal having the lowest available bandwidth without having an available bandwidth of the predetermined reference bandwidth or less.

11. The QoS-facilitating video streaming method of claim 9, wherein the adjusting the qualities of the video streams further comprises:
    adjusting a quality of a video stream which is transmitted by using the second layer based on an available bandwidth of a predetermined important terminal when the predetermined important terminal is included in the user terminals having an available bandwidth of the predetermined reference available bandwidth or less.

12. The QoS-facilitating video streaming method of claim 1, wherein the first section network state information and the second section network state information include at least one from among a packet loss, a jitter, and a delay,
wherein the plurality of respective layers correspond to the plurality of respective video streams; and
wherein the adjusting of the qualities of the plurality of respective video streams for the respective layers comprises:
adjusting the qualities of the plurality of respective video streams for the plurality of respective layers based on a change of a numerical value of at least one from among the packet loss, the jitter, and the delay.

13. A transmitting server comprising:
a transmitting unit configured to transmit, to a relay server, a video stream including a plurality of video data streams, a first video data stream of the plurality of video data streams corresponding to a first layer of a plurality of respective layers of the video stream, and a second video data stream of the plurality of video data streams corresponding to a second layer of a plurality of respective layers of the video stream;
a first receiving unit configured to receive, from the relay server, first section network state information, which is information about the network state between the relay server and the transmitting server;
a second receiving unit configured to receive, from the relay server, second section network state information, which is information about the network state between a plurality of respective user terminals and the transmitting server; and
an adjustment unit configured to adjust a transmission rate of the first video data stream by using the first section network state information and the second section network state information;
wherein each of the transmitting unit, the first receiving unit, the second receiving unit, and the adjustment unit are implemented via at least one central processing unit or at least one hardware processor,
and every data of the first video data stream is transmitted to first corresponding user terminals of the plurality of respective user terminals through the relay server at the adjusted transmission rate, and every data of the second video data steam is transmitted to second corresponding user terminals of the plurality of user terminals at the original transmission rate of the second video data stream through the relay server.

14. The transmitting server of claim 13, wherein the plurality of layers comprises the first layer and a second layer,
wherein the first layer corresponds to a first video stream of the plurality of respective video streams, and the second layer corresponds to a second video stream of the plurality of respective video streams; and
wherein the adjustment unit adjusts a quality of a video stream which is transmitted by using the second layer based on an available bandwidth of a user terminal having the lowest available bandwidth from among user terminals which receive a video stream by using the second layer.

15. A quality-of-service (QoS)-facilitating video streaming system comprising:
a transmitting server configured to transmit, to a relay server, a video stream including a plurality of video data streams, a video data stream of the plurality of video data streams corresponding to a layer of a plurality of respective layers of the video stream, and a second video data stream of the plurality of video data streams corresponding to a second layer of a plurality of respective layers of the video stream;
the relay server configured to transmit, to the transmitting server, first section network state information and second network state information, which are information on the network state with the transmitting server; and
a user terminal of a plurality of user terminals configured to transmit, to the transmitting server through the relay server, a piece of second section network state information of a plurality of pieces of second section network state information, which is information on the network state between the transmitting server and the user terminal,
wherein the transmitting server adjusts a transmission rate of the first video data stream by using the first section network state information and the second section network state information,
and every data of the first video data stream is transmitted to first corresponding user terminals of the plurality of respective user terminals through the relay server at the adjusted transmission rate, and every data of the second video data stream is transmitted to second corresponding user terminals of the plurality of user terminals at the original transmission rate of the second video data stream through the relay server.

16. A quality-of-service (QoS)-facilitating video streaming method comprising:
transmitting, by a transmitting server, to a relay server, a video stream including a plurality of video data streams, a first video data stream of the plurality of video data streams corresponding to a first layer of a plurality of respective layers of the video stream, and a second video data stream of the plurality of video data streams corresponding to a second layer of a plurality of respective layers of the video stream;
receiving, by the transmitting server, from the relay server, first section network state information which is information about a network state between the relay server and the transmitting server;
receiving, by the transmitting server, from the relay server, second section network state information which is information about a network state between a plurality of respective user terminals and the relay server; and
adjusting, by the transmitting server, by using the first section network state information and the second section network state information, a transmission rate of the first video data stream:
wherein every data of the first video data stream is transmitted to first corresponding user terminals of the plurality of respective user terminals through the relay server at the adjusted transmission rate, and every data of the second video data stream is transmitted to second corresponding user terminals of the plurality of user terminals at the original transmission rate of the second video data stream through the relay server.

17. A quality-of-service (QoS)-facilitating video streaming method comprising:
transmitting, by a transmitting terminal, to a relay server, a video stream including a plurality of video data streams, a video data stream of the plurality of video data streams corresponding to a first layer of a plurality of respective layers of the video stream, and a second video data stream of the plurality of video data streams corresponding to a second layer of a plurality of respective layers of the video stream;

receiving, by the transmitting terminal, from the relay server, first section network state information which is information about a network state between the relay server and the transmitting server;

receiving, by the transmitting terminal, from the relay server, second section network state information which is information about a network state between a plurality of respective user terminals and the transmitting server; and adjusting, by the transmitting terminal, by using the first section network state information and the second section network state information, a transmission rate of the first video data stream;

wherein every data of the first video data stream is transmitted to first corresponding user terminals of the plurality of respective user terminals through the relay server at the adjusted transmission rate, and every data of the second video data stream is transmitted to second corresponding user terminals of the plurality of user terminals at the original transmission rate of the second video data stream through the relay server.

* * * * *